Sept. 3, 1957  C. DAVIES, JR  2,805,143
METHOD AND APPARATUS FOR HEATING METAL
Filed Sept. 22, 1954  2 Sheets-Sheet 1
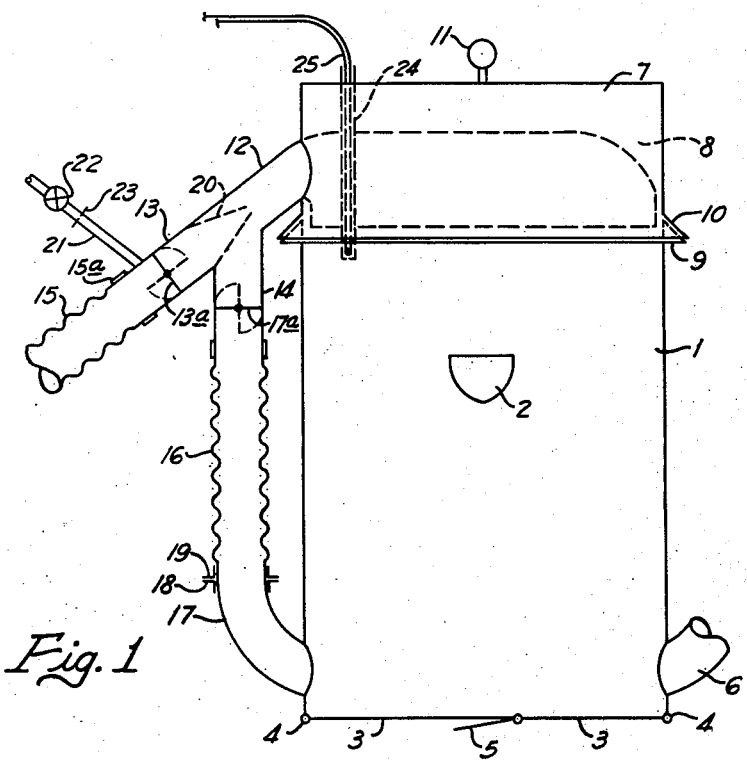
Fig. 1
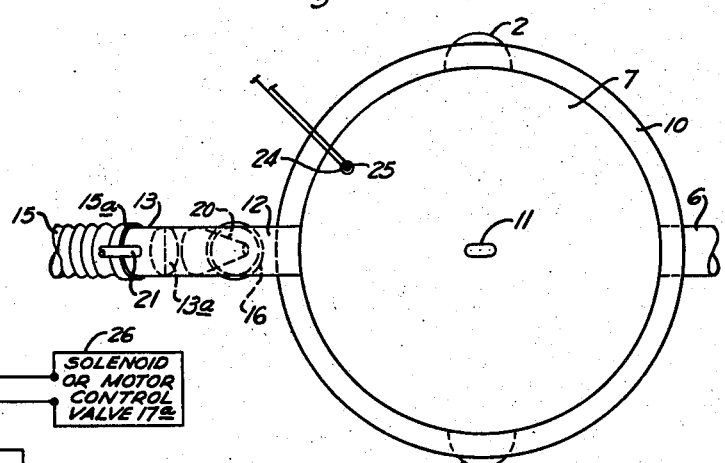
Fig. 2
Fig. 3
INVENTOR.
CALEB DAVIES, JR.
BY
HIS ATTORNEYS Sept. 3, 1957            C. DAVIES, JR            2,805,143

METHOD AND APPARATUS FOR HEATING METAL

Filed Sept. 22, 1954            2 Sheets-Sheet 2

INVENTOR.
CALEB DAVIES, JR.
BY

HIS ATTORNEYS

United States Patent Office 2,805,143
Patented Sept. 3, 1957

2,805,143

METHOD AND APPARATUS FOR HEATING METAL

Caleb Davies, Jr., Pittsburgh, Pa.

Application September 22, 1954, Serial No. 457,658

7 Claims. (Cl. 75—13)

This invention relates to the heating of metal, and more particularly to the heating of scrap metal intended for ultimate melting.

Although not limited thereto, the invention is especially applicable to the heating of steel scrap preparatory to melting it in an electric arc furnace, for which reason it will be described with particular reference thereto, by way of illustration but not of limitation.

In the electric steel industry the customary practice is to place a charge of scrap steel in the furnace and bring it up to melting heat by the action of the electric arc. It is well known that the heating of a charge of steel scrap by burning fuel is a comparatively efficient process within the temperature range which permits a low, or only moderately high, exit temperature for the combustion products but that thermal efficiency decreases together with increase of the cost of heating per B. t. u. going into the charge as the temperature of the charge rises. This effect can be compensated for to some extent by the use of regenerators or related heat recovery devices which, however, are expensive to construct and require considerable ground space. Thus, high temperature heat is more expensive than low temperature heat when accomplished by combustion. On the other hand, the cost of electric heating per available B. t. u. is more nearly constant throughout practical temperature ranges. Accordingly, the economic advantage of fuel instead of electricity for heating is substantially greater at relatively low temperatures but it diminishes as higher temperatures are reached.

An object of the present invention is to heat metal by burning fuel readily and efficiently within the ranges of temperature in which such heating is economically advantageous, and more particularly to preheating scrap metal for ultimate melting, especially in electric arc furnaces, whereby the electrical heating is used solely within the range in which it is most advantageously economical.

A further object is to heat metal efficiently by combustion without the use of regenerators and related heat recovery devices, and without causing excessive oxidation of the metal.

Other objects will appear from the following specification.

The invention will be described with reference to the accompanying drawings in which:

Fig. 1 is a schematic vertical elevation of the preferred embodiment of the invention;

Fig. 2 is a plan view of Fig. 1;

Fig. 3 is a schematic representation of control means for use with the embodiment shown in Figs. 1 and 2;

Figure 4:
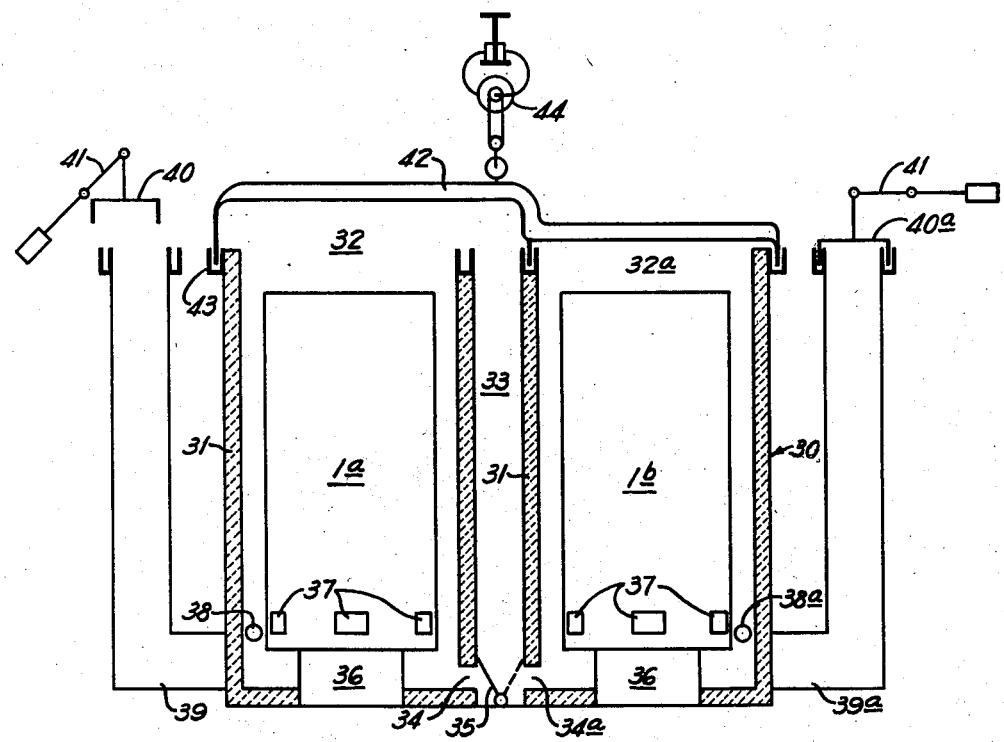
Fig. 4 is a view similar to Fig. 1 of a modified embodiment.

The invention is applicable with particular advantage in connection with the melting of metal in modern top-charging electric arc furnaces. Such furnaces are usually charged by means of a charging bucket having hinged bottom plates and which after being charged with scrap is moved by a crane over the open electric furnace and emptied into it through the hinged bottom of the bucket. After the furnace has received its charge of scrap and other materials a roof carrying the electrodes is set in place and heating is started. In the application of the present invention to the heating of scrap metal for use in an electric furnace the metal is heated in the charge bucket before being charged into the furnace.

In accordance with the invention hot combustion gases are passed downwardly from the top of the bucket through the charge of scrap, the gases cooled in passing through the charge are withdrawn adjacent the bottom of the bucket, and control of the temperature at the upper end of the charge is effected by recirculating a portion of the cooled combustion gases from the bottom of the bucket.

Having reference now to Figs. 1 and 2, there is shown a container 1 for metal to be heated which is generally in the form of the conventional electric furnace charging buckets, being provided with lifting lugs 2 and with bottom plates 3 having hinged connections 4 at their outer edges to the bottom of the bucket. Plates 3 are held in place during charging and heating by a conventional latch member 5. Adjacent the bottom of the container 1 there is provided at least one vent and associated exit conduit 6 for combustion gases.

In accordance with the invention heating is accomplished by hot combustion gases supplied to the top of the charge and passed downwardly through the charge to exit through vent 6. In the preferred embodiment of the invention this is accomplished by the construction shown in Figs. 1 and 2. A cover 7 provided internally with a refractory lining 8 is adapted to make a substantially gas tight seal when applied to the top of container 1. This may be accomplished in various ways, as by means of a sand seal. In the embodiment shown, however, the upper end of the container is provided with a downwardly and outwardly inclined flange 9 and the lower end of cover 7 is provided with a complementarily inclined flange 10 so that when the cover is applied the two flanges cooperate to naturally effect proper setting of the cover on the container. Preferably a heat resistant gasket, for instance of asbestos, not shown, is mounted between flanges 9 and 10. Cover 7 is provided with a ring 11 for engagement by a hook operated by a crane or other lifting device for application to and removal from the container.

As seen particularly in Fig. 1, there is associated with cover 7 a conduit 12 having branch members 13 and 14. Branch 13 is adapted to be connected to flexible metallic conduit 15 connected, as by clamping band 15a, to means for delivering a substantially constant flow of a combustible mixture of gas and air in proportion for correct combustion. Branch 14 is similarly adapted to be connected to a flexible metallic conduit 16 that is connected at its lower end to another vent pipe 17 leading from adjacent the bottom end of container 1. Vent pipe 17 is preferably permanently connected to the container, and suitably it is provided with a flange 18 for connection to a similar flange 19, as by wedge bolts, connected to the lower end of conduit 16.

Mounted at the upper end of branch 13 and extending interiorly of conduit 12 at the upper end of branch conduit 16 is a nozzle 20. Flow of the combustible mixture through branch 15 and nozzle 20 induces suction on the vertical branch conduit 16.

Mounted within conduit 16 is a butterfly valve 17a, and a similar valve 13a mounted within branch 13, to which there is likewise connected a conduit 21 leading to an auxiliary gas supply and which is provided with an automatically actuated valve 22, such as a solenoid shut-off valve. Mounted forwardly of valve 22 is a replaceable fixed orifice plate 23.

The cover 7 is provided with a well 24 that extends downwardly to a point short of the normal top level of the charge and which carries a thermocouple 25 or similar temperature responsive device.

In the practice of the invention cover 7 is removed from container 1, a charge of scrap metal is placed in the container, and the cover is replaced. Conduit 15 is connected to branch 13, and conduit 16 is connected at its ends to branch 14 and vent pipe 17. Auxiliary gas supply pipe 21 is connected to the gas source, and thermocouple 25 is connected to control equipment described hereinafter. Butterfly valve 17a is closed and valve 13a is opened to pass gas-air mixture through branch 13, conduit 12 and into the space above the charge in the container. The fuel mixture may be ignited in various ways, as by means of an electrical sparking device, or through a door, not shown, provided in cover 7, by means of a torch.

As a result of combustion the refractory lining of cover 7 heats rapidly and radiates heat down into the scrap. The hot products of combustion flow downwardly through the scrap and out through vent 6 at a comparatively low temperature. Convection effect tends to keep the heat distributed from the top to the bottom of the charge in successively cooler, substantially horizontal and substantially isothermal planes because if one side of the charge in any level begins to get hotter than the other side, the downward flow of hot combustion products tends to be retarded on the hot side and accelerated on the cooler side until substantial uniformity is approached. Thus during the early steps of heating the exit gases are discharged at the lowest temperature and with the highest thermal efficiency that is attainable without using auxiliary heat recovery equipment.

Soon after heating starts a substantial amount of the charge adjacent the top of the container becomes much hotter than the exit gas. Extreme temperature at the top is avoided in the early steps of heating in consequence of the rapid flow of high temperature heat downwardly into the cooler part of the charge. When the top temperature becomes nearly high enough to cause rapid scaling of the charge, or to cause it to soften and pack together, butterfly valve 17a is opened to recirculate a portion of the products of combustion cooled in their passage through the charge back to the top of the container through the action of nozzle 20, thus lowering the flame temperature by dilution with the substantially inert flue gas. Further control is to be had by opening valve 22 to supply a somewhat richer gas mixture. The tendency for scale formation increases as the temperature rises but at high temperature, for instance 1500° F., scaling is inhibited to some extent by the presence of a small proportion of carbon monoxide and hydrogen in the atmosphere in contact with the metal, which results from enriching the combustible mixture with gas through conduit 21.

The recirculation of combustion products through conduit 16 tends to equalize the temperature of the charge from top to bottom, and to heat the bottom of the charge more rapidly as well as to raise the exit temperature of the gas and decrease thermal efficiency. When excessive temperature is reached at the top of the charge in spite of such recirculation heating is stopped by closing butterfly valve 13a and valve 22, if the latter has been opened. Conduits 15 and 16 are then disconnected from the branches, and conduit 21 from the gas source. Valve 17a is also preferably closed to avoid convectional cooling of the scrap due to its stack effect. The container may now be moved to an electric furnace and its heated contents discharged by manipulating latch 5 to permit plates 3 to drop. Thereafter the container is ready for reuse in the manner just described.

Thermocouple 25 is used to measure the temperature adjacent the top of the charge for the purposes just indicated. Most suitably it is applied to automatic control of the various valves. This may be accomplished in various ways using conventional means such as are indicated in Fig. 3. Thus the leads 25 from the thermocouple are connected to an amplifier 25a that serves to actuate a solenoid or motor control 26 for valve 17a to open or close it at the appropriate time, and another solenoid control 27 for valve 22 to open it or close it suitably and at the proper time. The amplifier likewise is used to actuate an audible or visible signal when excessive temperature is reached requiring shutting off of the supply of gas and air, as indicated at 28, which means may likewise actuate a solenoid control to close valve 13a at the proper time.

Figure 5:
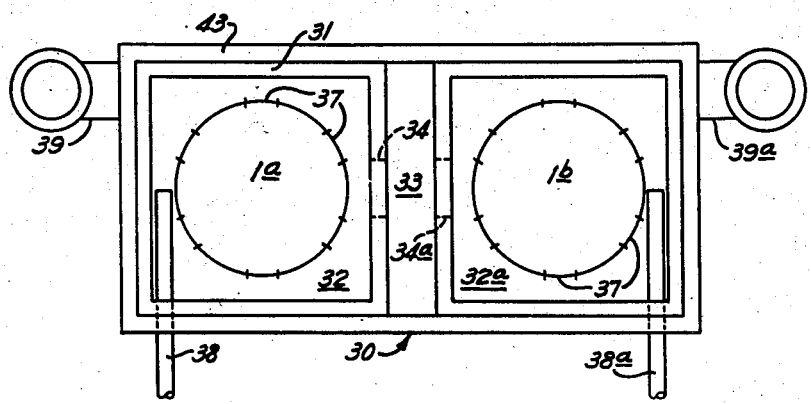
Fig. 5 is a plan view of Fig. 4.

The principle described above may be applied to a tandem heating of metal. For instance, as shown in Figs. 4 and 5 a furnace 30 provided with an insulating refractory lining 31 is divided into two compartments 32 and 32a by a central flue 33 which terminates short of the bottom of the furnace to provide ports 34 and 34a connecting the two compartments. A reversing valve 35 is mounted at the lower end of flue 33 to control the flow of gases from one compartment to the other. Containers 1a and 1b are preferably mounted above the bottom of the furnace on piers 36, and they are provided adjacent their lower ends with vent openings 37.

The compartments are provided with burners 38 and 38a extending through the furnace wall adjacent its bottom, and they are provided, respectively, with flues 39 and 39a, the upper ends of which may be closed by cap members 40 and 40a, respectively, that may be replaced or removed in any suitable way, for instance manually or automatically, as by means of a pivoted weighted lever 41. The furnace is closed by a cover 42 so constructed as to connect the top of flue 33 to the top of one or the other of compartments 32 and 32a in the manner presently to be described. Most suitably cover 42 forms a substantially gas tight seal with the top of the furnace, as by means of sand carried in a channel 43 at the top of the furnace and into which the lower edge of the cover extends.

In the use of this embodiment one container is undergoing the first step of heating while the other container is undergoing the second, or last, step. Fig. 4 shows the left bucket 1a in the first step and the right bucket 1b in the final step. Cover 42 is so disposed so that combustion gases pass upwardly through port 34a, through flue 33 and downwardly through the charge in container 1a. Cap 40a during this period closes flue 39a. Burner 38a in compartment 32a is active, with the flame being preferably slightly richer than for theoretically perfect combustion. Reversing valve 35 is in its left hand position as viewed in Fig. 4. Burner 38 in compartment 32 is shut off, and cover 40 for flue 39 has been removed. Thus combustion takes place in compartment 32a with the combustion gases moving upwardly around the container and downwardly through its metal charge, leaving the container through vents 37. The combustion gases also pass through port 34a, upwardly through flue 33 and downwardly through the charge in the bucket 1a in compartment 32, leaving through vents 37 and through flue 39. Convection forces tend to keep the space around the container from getting much hotter than the voids within the charge.

When the scrap in the container in compartment 32a is needed, burner 38a is shut off and cover 40 is applied to flue 39. The furnace cover 42 is then removed, as by means of an electrically actuated chain hoist 44, container 1b is removed from compartment 32a and carried to its point of use. A container of fresh cool scrap is replaced in compartment 32a and cover 42 is then replaced in reversed position, and reversing valve 35 is moved to its right hand position in Fig. 4 whereby the operation and effects just described are reversed, burner 38 now being active, flue 39 closed, and flue 39a being opened by removal of cover 40a. Container 1a in compartment 32 receives its final heating by hot combustion gases from burner 38 that flow downwardly through the charge in the container, out through vents 37 and the port 34, upwardly through flue 33 and downwardly through the charge in the container 1b in compartment 32a, thus giving its charge the first step of the heating. The cooled combustion gases from compartment 32a are exhausted through vents 37 and 39a.

Thermostatically controlled blowers, e. g., jet blowers, may be associated with each of the two compartments for recirculating a portion of the combustion gases from the bottom to the top, for temperature control as described hereinabove. Thus in the two chamber installation substantially uniform temperature may be obtained throughout the charge in the final stage of heating, while a relatively low exit temperature, and a controlled temperature difference between the top and the bottom, may be maintained in the unit which is in the first stage of operating. A controlled or constant flow of air may be introduced at the top of flue 33, or at the top of the first stage container, to burn the excess fuel gas from the final stage chamber.

Various modifications are, of course, permissible. For instance, conduit 12, Fig. 1, may be permanently connected to the upper end of container 1 instead of to the cover 7. In this way the construction of the cover is simplified and conduit 16 may be permanently connected to vent pipe 17 and branch 14. Container 1 may be provided with outside insulation, or the same result may be accomplished by an internal lining of insulating material protected by an inner metallic lining.

Again, heating of metal in accordance with the invention may be accomplished, if desired, by heating the metal in the manner described in the furnace in which it is to be melted electrically. Such a furnace would have the conventional removable roof carrying electrodes, and would preferably be equipped as in the immediately preceding modification. Most suitably two such furnaces would be provided, one undergoing scrap preheating while the other is melting electrically. The roles of the two furnaces would then be reversed. In this way the plain cover and that carrying electrodes would shift back and forth from one furnace to the other.

Also, a thermocouple may be placed in an exhaust vent 6 to actuate the shut-off controls when the temperature of the exit gas reaches a point where thermal efficiency becomes undesirably low.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. That method of heating metal comprising the steps of disposing a charge of the metal in a vertical container, passing hot combustion gases into the top of the container and vertically downwardly through said charge to heat the charge progressively and in substantially horizontal planes, withdrawing cooled combustion gases adjacent the bottom of the container, and controlling the temperature of the metal in the upper portion of the charge by recirculating to the top of the container a portion of the cooled combustion gases from the bottom of the container.

2. That method of heating scrap metal comprising the steps of disposing a charge of the metal in a closed heat resistant vertical container, passing hot combustion gases into the top of the container and vertically downwardly through said charge to heat the charge progressively in substantially horizontal planes, withdrawing cooled combustion gases adjacent the bottom of the container, and controlling the temperature of the metal in the upper portion of the charge by recirculating into said hot combustion gases a portion of the cooled combustion gases from adjacent the bottom of the container.

3. That method of heating scrap metal comprising the steps of disposing a charge of the metal in a closed heat resistant vertical container, passing hot combustion gases into the top of the container and downwardly through said charge, withdrawing cooled combustion gases adjacent the bottom of the container, and controlling the temperature of the metal in the upper portion of the charge by recirculating to the top of the container a portion of the cooled combustion gases from adjacent the bottom of the container, and subsequently melting electrically the thus heated metal.

4. That method of heating metal comprising the steps of disposing a charge of the metal in a closed heat resistant vertical container, passing a combustible gas mixture to the top of said charge for flame combustion thereat, passing the combustion products vertically downwardly through the charge to heat the charge progressively and in substantially horizontal planes, withdrawing combustion products adjacent the bottom of the charge, and controlling the flame temperature and the temperature of metal at the top of the charge by recirculating to said mixture combustion products from adjacent the bottom of the charge.

5. That method of heating metal comprising the steps of disposing a charge of the metal in a first closed container, passing heated combustion gases from the top of the charge downwardly therethrough, and withdrawing the gases adjacent the bottom of the charge and thereby partially heating the charge, applying flame combustion to a charge so partially heated in a second similar container, passing the products of combustion downwardly through the charge to complete its heating, withdrawing said products adjacent the bottom of the charge and passing them to said first container, and controlling the flame temperature by recirculating thereto a portion of said products from adjacent the bottom of the second container.

6. Apparatus for heating metal comprising a vertical open top heat-resistant container member provided adjacent its lower, closed end with at least two vents, a removable cover member adapted to make a substantially gas tight fit with the top of said container, a branched conduit associated with one of said members, one of the branches of said conduit being adapted to be detachably connected to a source of combustible gas-air mixture, the other branch being associated with one of said vents, valve means in each of said branches, temperature responsive means associated with said top member, and means operatively connected between said temperature responsive means and said valve means for regulating flow through at least one of said branches in response to temperature changes in said container.

7. Apparatus for heating metal comprising a vertical open top heat-resistant container member provided adjacent its lower, closed end with at least two vents, a removable cover member adapted to make a substantially gas tight fit with the top of said container, a branched conduit associated with one of said members, one of the branches of said conduit being adapted to be detachably connected to a source of combustible gas-air mixture, the other branch being associated with one of said vents, valve means in each of said branches, temperature responsive means associated with said top member, and means operatively connected between said temperature responsive means and said valve means for regulating flow through said branches in response to temperature changes in said container.

References Cited in the file of this patent

UNITED STATES PATENTS 2,029,580    Merkt    Feb. 4, 1936